(12) United States Patent
Yamazaki et al.

(10) Patent No.: US 7,652,870 B2
(45) Date of Patent: Jan. 26, 2010

(54) MULTILAYER CERAMIC CAPACITOR

(75) Inventors: Youichi Yamazaki, Kagoshima (JP);
Kiyoshi Matsubara, Kagoshima (JP);
Hiromi Seki, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/147,297

(22) Filed: Jun. 26, 2008

(65) Prior Publication Data

US 2008/0266751 A1    Oct. 30, 2008

Related U.S. Application Data

(63) Continuation-in-part of application No. PCT/JP2006/325613, filed on Dec. 22, 2006.

(30) Foreign Application Priority Data

Dec. 26, 2005  (JP)  ............................. 2005-372411
Mar. 27, 2006  (JP)  ............................. 2006-085113

(51) Int. Cl.
*H01G 4/06* (2006.01)

(52) U.S. Cl. ............... 361/321.2; 361/321.1; 361/321.4; 361/321.5; 361/311; 361/312; 501/137; 501/138; 501/139

(58) Field of Classification Search ......... 361/311–313, 361/321.4, 321.5, 306.1, 306.3, 321.1, 321.2, 361/301.2, 301.4; 501/137–139
See application file for complete search history.

(56) References Cited

U.S. PATENT DOCUMENTS

| 4,461,844 | A  | * | 7/1984  | Itakura et al. | ............... 501/137 |
|-----------|----|----|---------|----------------|------------------------|
| 6,205,015 | B1 |    | 3/2001  | Wada et al.    |                        |
| 6,437,969 | B2 | * | 8/2002  | Mizuno et al.  | ............... 361/311 |
| 6,656,865 | B2 | * | 12/2003 | Saito et al.   | ................ 501/137 |
| 6,785,121 | B2 | * | 8/2004  | Nakano et al.  | ........... 361/321.2 |
| 6,853,536 | B2 | * | 2/2005  | Nakamura et al. | ....... 361/321.4 |
| 7,057,876 | B2 | * | 6/2006  | Fujioka et al. | ........... 361/321.4 |
| 7,433,173 | B2 | * | 10/2008 | Iwasaki et al. | ........... 361/321.4 |
| 2006/0088709 | A1 | * | 4/2006 | Ito et al.   | ..................... 428/325 |

FOREIGN PATENT DOCUMENTS

| JP | 11273986    | 10/1999 |
| JP | 2003-040671 | 2/2003  |
| JP | 2005-22891  | 1/2005  |
| JP | 2005-277393 A | 6/2005 |

OTHER PUBLICATIONS

Kunieda, Takehisa et al., "Properties of Hydrothermal Barium Titanate Powders", Creative, 2004, No. 5, pp. 67-77.

* cited by examiner

*Primary Examiner*—Nguyen T Ha
(74) *Attorney, Agent, or Firm*—Birch, Stewart, Kolasch & Birch, LLP

(57) ABSTRACT

A multilayer ceramic capacitor includes a plurality of ceramic dielectric layers, a plurality of inner electrode layers and and external electrodes. The ceramic dielectric layers includes barium titanate crystal grains having pores inside. The inner electrode layers are between the ceramic dielectric layers. The external electrodes are electrically connected to the inner electrode layers. The barium titanate crystal grains each have a core-shell structure which include a core and a shell around the core. The the pores are mainly formed in the cores.

9 Claims, 8 Drawing Sheets

MULTILAYER CERAMIC CAPACITOR

The present application is a National Stage entry of PCT/JP2006/325613 filed on Dec. 22, 2006. Priority is also claimed to Japanese patent application 2005-37241 filed Dec. 26, 2005 and Japanese patent application 2006-085113 filed Mar. 27, 2006 under 35 U.S.C. § 119.

BACKGROUND OF THE INVENTION

1. Field of the Invention

The present invention relates to multilayer ceramic capacitors and particularly to a multilayer ceramic capacitor including ceramic dielectric layers mainly composed of barium titanate crystal grains having pores therein.

2. Description of the Related Art

In recent years, size-reduction and higher capacitance are increasingly required for multilayer ceramic capacitors for use in small, high-performance electronic devices such as cellular phones. Therefore, reducing the thickness of and increasing the number of ceramic dielectric layers and internal electrodes to be stacked has been pursued. Such a multilayer ceramic capacitor includes ceramic dielectric layers and internal electrode layers each 3 μm or less in thickness, and the number of layers stacked is 100 or more. In order to reduce the cost required to increase the number of layers to be stacked, the internal electrode layers of a small, high-capacitance multilayer ceramic capacitor are usually composed of a base metal, Ni rather than a known material, Ag—Pd.

In such a multilayer ceramic capacitor including many thin layers, a finer barium titanate powder is being used to achieve a further thickness reduction of ceramic dielectric layers. Thus, various processes for obtaining finer barium titanate powder have been devised. The dominant process for preparing a barium titanate powder has been a solid phase process in which a barium carbonate powder and a titanium oxide powder are used as the raw materials. However, recently, wet processes for preparing barium titanate powder such as a hydrothermal synthetic process and a coprecipitation process are put into practice to replace the solid phase process. Especially, the hydrothermal synthetic process is known as a process for fine, highly tetragonal barium titanate powders.

Barium titanate powders prepared by the hydrothermal synthetic process are mixed with various additives such as a glass component and an anti-reducing agent and the resulting mixture is fired in a reducing atmosphere. Numerous pores are formed in all parts of barium titanate crystal grains, such as near the grain surface and in the center region of the grain (see FIG. 8). A multilayer ceramic capacitor having ceramic dielectric layers sintered using such barium titanate powders has low reliability in a highly accelerated life test involving application of DC voltage at high temperature.

BRIEF DESCRIPTION OF THE DRAWINGS

FIGS. 7A to 7C-2 are diagrams showing the steps of making the multilayer ceramic capacitor.

DESCRIPTION OF THE PREFERRED EMBODIMENTS

The present invention provides a multilayer ceramic capacitor that exhibits improved reliability in a highly accelerated life test despite thickness reduction of its ceramic dielectric layers.

According to an aspect of the present invention, a multilayer ceramic capacitor includes a plurality of ceramic dielectric layers, a plurality of inner electrode layers and external electrodes. The ceramic dielectric layers include barium titanate crystal grains which have pores inside. The inner electrode layers are between the ceramic dielectric layers. The external electrodes are electrically connected to the inner electrode layers. The shell has a proportion of tetragonal crystals lower than that of the core. The pores are mainly in the cores.

The meaning of the phrase "pores are mainly formed in the cores" is that the percentage of the barium titanate crystal grains having pores only in the cores is about 90% or more of the total number of the barium titanate crystal grains observed.

Figure 1A:
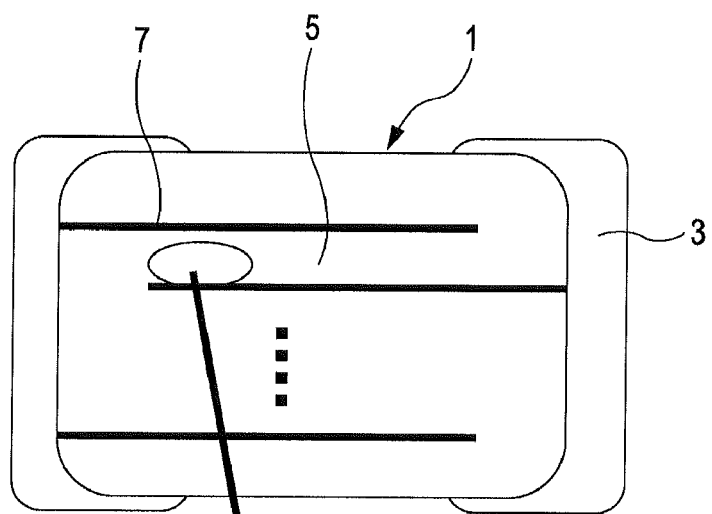
FIG. 1(A) is a schematic cross-sectional view showing a multilayer ceramic capacitor of an embodiment of the present invention and FIG. 1(B) is an enlarged view of the interior of the capacitor.
Figure 1B:
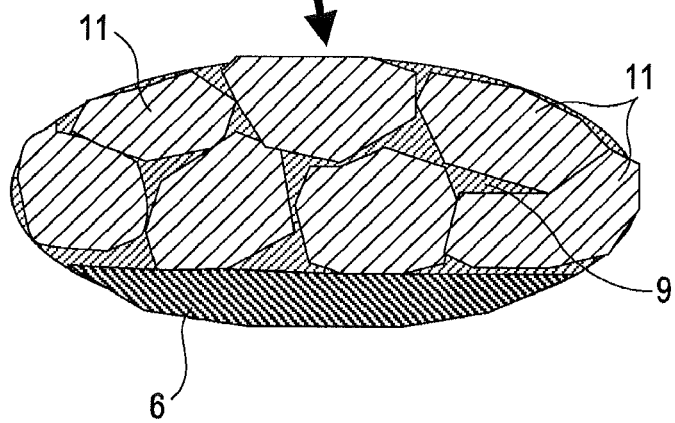

Referring to FIG. 1(A) and FIG. 1(B), the multilayer ceramic capacitor includes a capacitor main body 1 and external electrodes 3 respectively disposed on two end faces of the capacitor main body 1. The capacitor main body 1 includes ceramic dielectric layers 5 and internal electrode layers 7 alternately stacked, The ceramic dielectric layers 5 are composed of a plurality of barium titanate crystal grains 11 with crystal grain boundaries 9 between the barium titanate crystal grains 11. Barium titanate crystal grains contain barium titanate as a main component and additives for controlling the dielectric characteristics of the grains.

Figure 2:
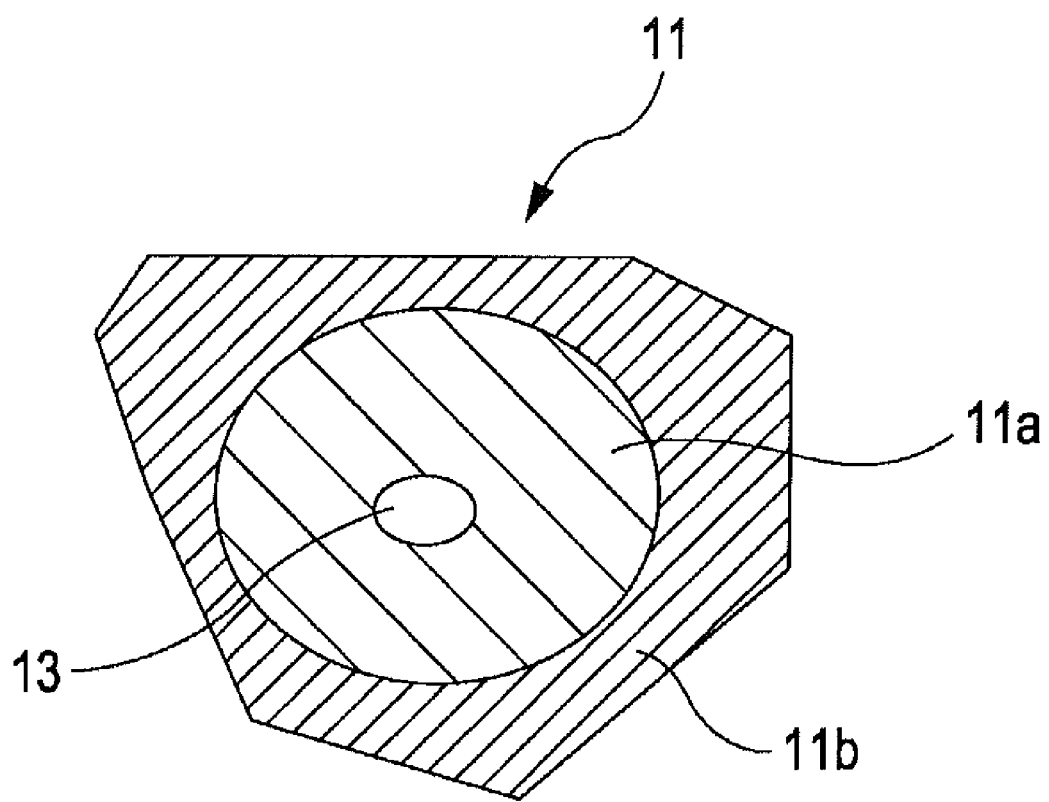
FIG. 2 is a schematic cross-sectional view showing the inner structure of a barium titanate crystal grain in the ceramic dielectric layer of the multilayer ceramic capacitor.

In FIG. 2, the barium titanate crystal grain 11 in the ceramic dielectric layer 5 of the multilayer ceramic capacitor has a core-shell structure including a core 11a and a shell 11b surrounding the core 11a.

The core 11a is composed of nearly pure barium titanate. The main crystal structure of the core 11a is a perovskite structure having a high tetragonal ratio. A lattice constant ratio c/a can be used as an indicator of the tetragonality of the perovskite crystal. The average lattice constant ratio c/a of the perovskite crystal of the core 11a is preferably in the range of 1.002 to 1.008 to increase the relative dielectric constant.

The average lattice constant ratio c/a is calculated from the lattice constants of the a-axis and c-axis by X-ray diffraction of powders of the multilayer ceramic capacitor material. The planes (200) and (002) are used for the measurement of the lattice constants.

The shell 11b contains various additives dissolving from the surface of the barium titanate crystal grain 11. The shell 11b mainly takes a cubic perovskite crystal structure and has a low tetragonal ratio.

The shell 11b is tetragonal before dissolution of the additives. As the additives dissolve into barium titanate, rearrangement of crystals occurs and the crystal structure of the shell 11b changes to cubic. Due to the rearrangement of the crystals, crystal defects are fewer in the shell 11b compared to the core 11a. The observed lattice constant ratio c/a of the shell 11b is in the range of 1 to 1.001. The shell 11b may exhibit a partially tetragonal crystal structure.

The barium titanate crystal grains 11 of the multilayer ceramic capacitor have pores 13 mainly in the core 11a. The grain may have only one pore 13 at the core 11a and the pore 13 may be substantially in the core 11a. The insulating property of the shell 11b, which greatly contributes to the insulating property of the barium titanate crystal grain 11, can be enhanced by substantially eliminating the pores from the shell 11b, and arranging the pores 13 in the core 11a, especially at the center thereof.

As discussed above, in the barium titanate crystal grain 11 in the ceramic dielectric layer 5 of the multilayer ceramic capacitor, the shell 11b has an uniform crystal structure due to rearrangement of atoms caused by dissolution of the additives, and the pores 13 that have been originally present in the shell 11b migrate to the core 11a. Thus, the barium titanate crystal grains 11 in the ceramic dielectric layer 5 of the multilayer ceramic capacitor have pores concentrated in the cores 11a.

The ceramic dielectric layer 5 composed of the barium titanate crystal grains 11 exhibits an improved insulating property since the crystal structure of the barium titanate crystal grains 11 in the region near the surface (shell 11b) is homogeneous, and thus high reliability is exhibited in a highly accelerated life test in which DC voltage is applied under a high-temperature environment.

Figure 3:
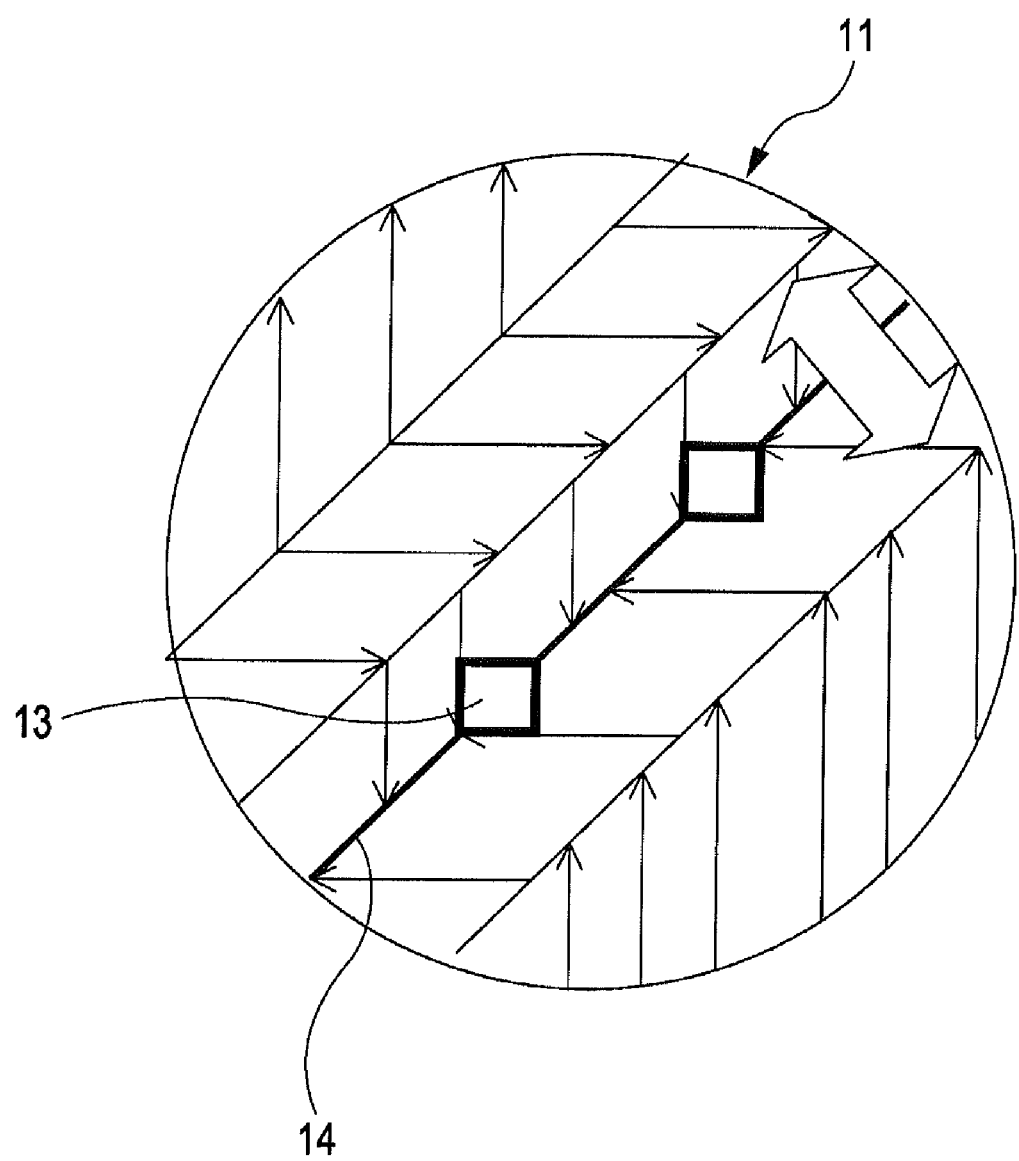
FIG. 3 is a schematic diagram showing the movement of the domain walls in a barium titanate crystal grain.

Referring to FIG. 3, since the ceramic dielectric layer 5 of the multilayer ceramic capacitor includes barium titanate crystal grains 11 each having the pores 13 in the core 11a inside the grain, the following effects on the dielectric characteristics are achieved.

First, since the barium titanate crystal grains at the core 11a have a tetragonal crystal structure, the core exhibits ferroelectricity. Pores in the core exhibit a pinning effect and suppress movement of the domain walls. Thus, the barium titanate crystal grains having pores in the core are suppressed from entering a single domain state in the c-axis direction of the tetragonal phase, i.e., the direction of applied voltage. As a result, the decrease in capacitance of the multilayer ceramic capacitor during DC bias application can be suppressed, and good DC bias characteristics can be achieved.

In contrast, as in the known barium titanate crystal grains, the crystal structure of the shell 11b, which is the region near the surface of the barium titanate crystal grain 11, tends to be inhomogeneous if the pores 13 are scattered and exist in the shell 11b in a large proportion. Thus, high insulating property is not achieved, and high reliability is not achieved under the highly accelerated life test.

Moreover, since the shell 11b having poor insulating property has a poor pinning effect, the decrease in capacitance under application of a DC bias becomes large.

The average grain diameter of the barium titanate crystal grains 11 in the ceramic dielectric layer 5 of the multilayer ceramic capacitor is preferably 0.05 to 0.244 µm. At an average grain diameter of 0.05 µm or more, the barium titanate crystal grains 11 can take clear core-shell structures, thereby clearly defining the core 11a and the shell 11b, increasing the dielectric constant, and enhancing the insulating property.

At an average grain diameter of the barium titanate crystal grains 11 of 0.244 µm or less, the thin ceramic dielectric layers 5 sinter through many crystal grain boundaries 9, thereby achieving high insulating property.

The average grain diameter of the barium titanate crystal grains 11 in the ceramic dielectric layer 5 of the multilayer ceramic capacitor may be 0.124 to 0.19 µm. Such a multilayer ceramic capacitor exhibits a low decrease in resistance of the grain boundaries in the highly accelerated life test and improved bias characteristic.

Figure 4:
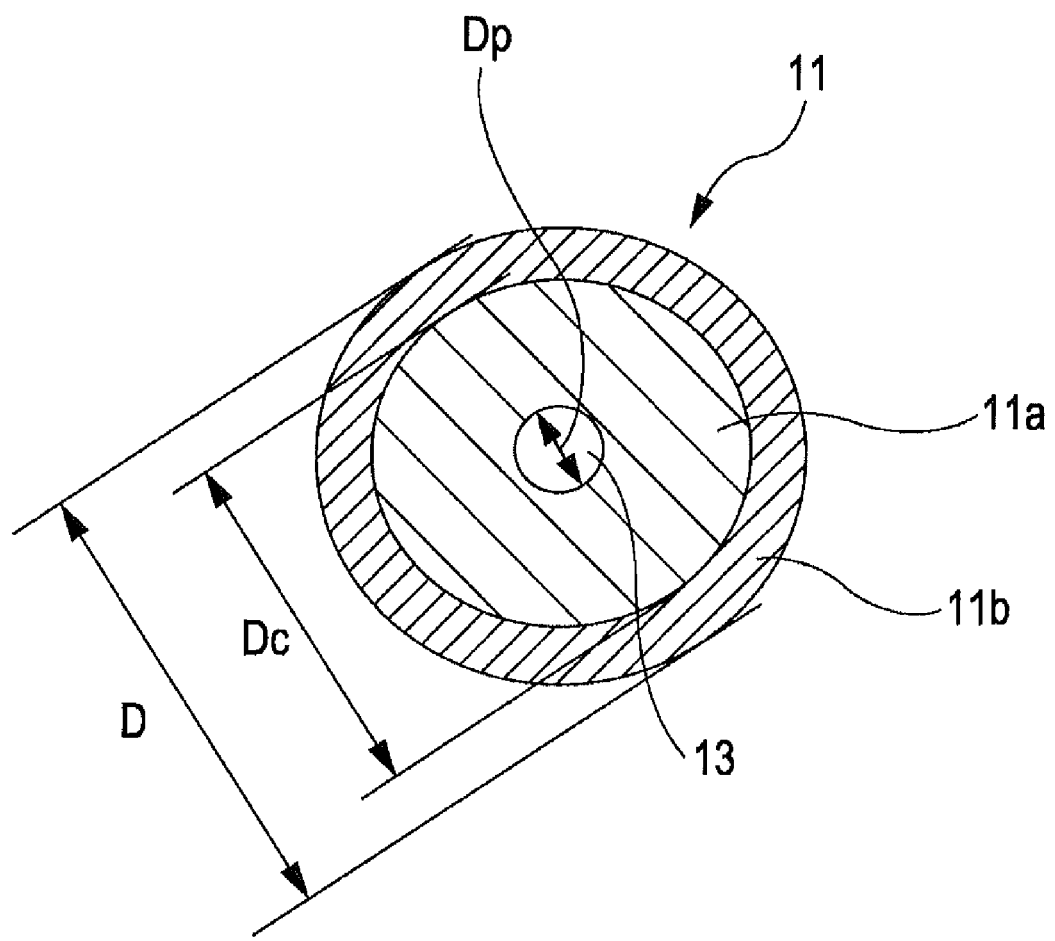
FIG. 4 is a schematic cross-sectional view of a barium titanate crystal grain 11 represented as a sphere.

FIG. 4 is a schematic cross-sectional view of a barium titanate crystal grain 11 represented as a sphere. The relationship between the core 11a and the shell 11b depends on the amounts of various additives and the size of the crystal grains; the relationship can be described with reference to the cross-sectional view by assuming that the barium titanate crystal grain 11 has a spherical shape. In this embodiment, Dc/D=0.2 to 0.8 where D represents the diameter of the barium titanate crystal grain 11 and Dc represents the diameter of the core 11a. At Dc/D of 0.2 or more, the core 11a is sufficiently large so that there is a sufficient highly tetragonal region even when the pores 13 are in the core 11a in a concentrated manner, thereby achieving a high relative dielectric constant. At Dc/D of 0.8 or less, the thickness of the shell 11b is sufficiently large, and thus the insulating property can be enhanced with the thick shell 11b. Thus, the ratio $D_c/D$ ranges from $0.2 \leq D_c/D \leq 0.8$.

In this embodiment, the core 11a of the barium titanate crystal grain 11 is defined as a region at the center of the barium titanate crystal grain 11 where parallel streaks of crystals indicating the domain regions appear under observation with a transmission electron microscope or a scanning electron microscope. The shell 11b is defined as a region outside the core 11a.

The average diameter Dp of the pores 13 present in the core 11a in the barium titanate crystal grain 11 may be 0.2 or less of the average grain diameter D of the barium titanate crystal grain 11. The ratio is preferably in the range $0.11 \leq D_p/D \leq 0.2$. Dp is determined as follows. If a grain has only one pore, the maximum diameter is set forth as $D_p$. If a grain has two or more pores, the average maximum diameters of the pores is set forth as $D_p$.

As discussed above, the ceramic dielectric layer 5 of the multilayer ceramic capacitor contains various additives. The additives are preferably magnesium (Mg), a rare earth element, and manganese (Mn). At least one of these additives is preferably contained in the dielectic layer 5. Here, "rare earth element" includes lanthanide series elements and yttrium.

Magnesium coating the surface of the barium titanate crystal grain 11 enhances the insulating property of the barium titanate crystal grain 11 and exhibits a barrier effect that suppresses dissolution of other additives added afterward.

Manganese contributes not only to high insulating property but also to enhanced durability against reduction in particular.

The rare earth element also contributes to improving the insulating property of the barium titanate crystal grain 11 and has effects of improving the relative dielectric constant and stabilizing the temperature characteristic of the relative dielectric constant. In particular, when the barium titanate powder coated with a rare earth element is used, the rare earth element tends to form a dissolution layer on the surface of the barium titanate crystal grain 11.

This may be observed by Energy Dispersion X-ray Spectroscopy (EDS) accompanied by Transmission Electron Microscopy (TEM). That is, the concentration of rare earth element is reduced from the surface to the center of a grain and the core substantially contains no rare earth element.

The solid solution of the rare earth element in the barium titanium oxide is also evaluated using X-ray Photoelectron Spectroscopy (XPS). XPS can analyze the chemical bonding state of the atoms constituting the crystal.

To be more specific, a peak intensity ratio REp/Os of the peak intensity of the p-orbital of the rare earth element (near 24 eV) to the peak (21 eV) of O2s in a valence band spectrum with a decreased base line is determined. In this analysis, it is considered that the smaller peak intensity ratio REp/Os indicates a higher degree of dissolution of the additive elements. In general, it is considered that the grain diameter increases as dissolution of the rare earth element into barium titanate progresses. Thus, the diameter of the crystal grain is measured under SEM observation and the relationship between the grain diameter and the XPS peak intensity ratio REp/Os is studied to arrive at the relationship: I=a+bD (a>0, b<0), where I represents the peak intensity ratio (REp/Os), D represents the average grain diameter of the crystal grains, a represents the y intercept (D=0) in the linear equation of the graph, I=a+bD, and b represents the slope of the line. When the diameter of the barium titanate crystal grains is in the range of 0.05 to 0.5 μm and the XPS peak intensity ratio REp/Os is in the range of 0.3 to 0.7, dissolution of the rare earth element into the crystal grain has occured. Furthermore, if the average grain diameter of the barium titanate crystal grains is in the range of 0.1 to 0.3 μm and the XPS peak intensity ratio REp/Os is in the range of 0.4 to 0.6, particularly, 0.49 to 0.59, then it is shown that the rare earth element has dissolved into the shell of the barium titanate crystal, forming a complete layer.

The barium titanate crystal grains may be almost pure barium titanate represented by $BaTiO_3$ (Ca: 0.2 atomic % or less) but may include barium calcium titanate crystal grains containing 0.4 atomic % or more of Ca. The Ca content in the barium calcium titanate crystal grains is preferably 1 atomic % or less so that the heterogeneous phase such as $CaTiO_3$ is reduced and a substantially single phase is formed.

In the case where a composite of barium titanate crystal grains and barium calcium titanate crystal grains is used, a higher relative dielectric constant can be obtained and the temperature characteristic of the relative dielectric constant can be stabilized compared to when the barium titanate crystal grains are used alone. This is because the relative dielectric constant of barium titanate is originally high and the AC-voltage dependency of the relative dielectric constant of barium calcium titanate is higher than that of barium titanate. Barium calcium titanate is ideally represented by $(Ba_{1-x}Ca_x)TiO_3$ (X=0.01 to 0.2).

In the ceramic dielectric layer 5 of the multilayer ceramic capacitor of this embodiment, $BaTiO_3$ and $(Ba_{1-x}Ca_x)TiO_3$ constituting the barium titanate crystal grains 11 preferably have a molar ratio of A sites (Ba or Ca) to B sites (Ti) satisfying A/B≧1.003. The maximum of the ratio is 1.008; the ratio is preferably 1.003≦A/B≦1.005. In this invention, the grain growth of the barium titanate crystal grains 11 can be suppressed by controlling the ratio A/B of the barium titanate crystal grains 11 as such.

Figure 5:
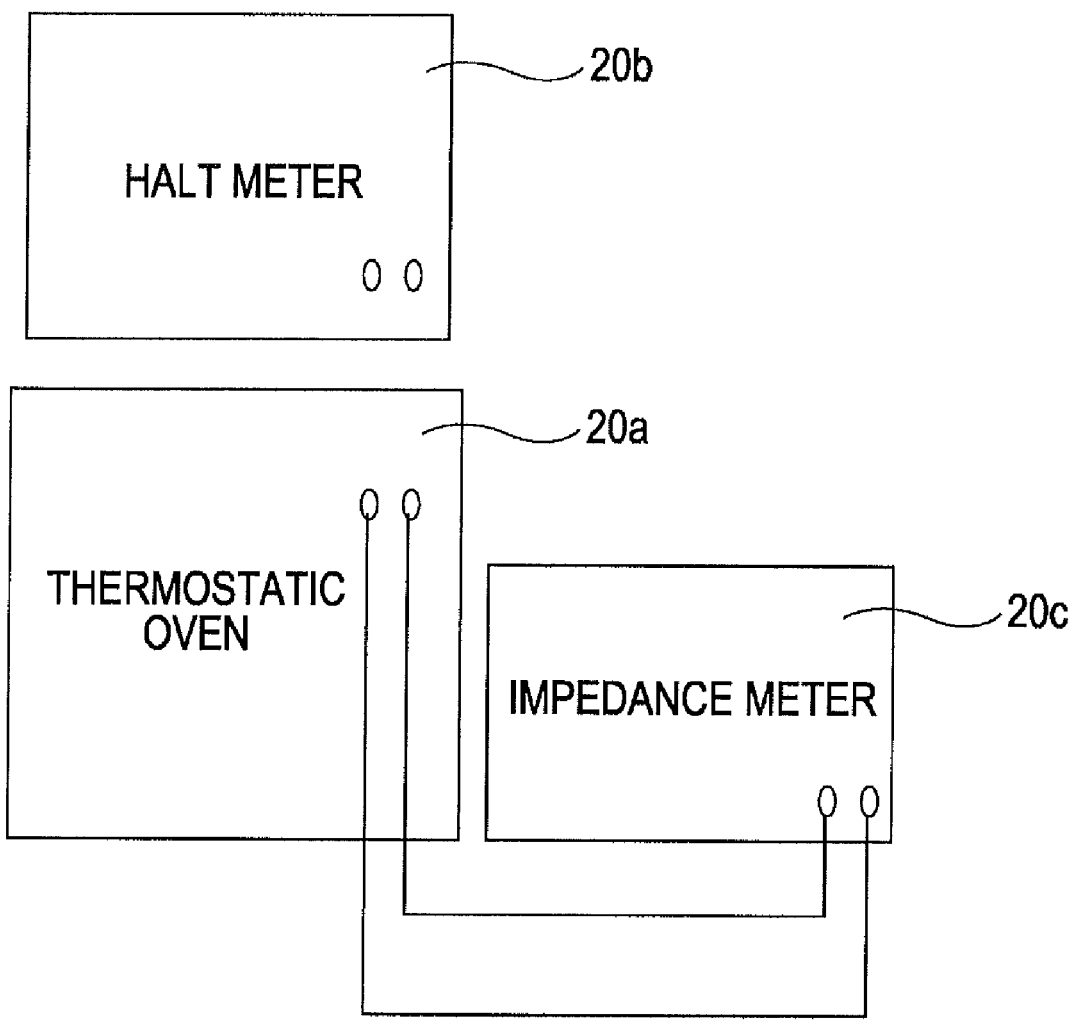
FIG. 5 is a schematic diagram showing the process of evaluating the resistance of the grain boundaries in the ceramic dielectric layer by using an AC impedance meter.

Referring to FIG. 5, a sample of a multilayer ceramic capacitor is mounted in a thermostatic oven 20a where the temperature is controlled and a DC voltage is applied to the sample from a Highly Accelerated Life Test (HALT) meter 20b. The impedance is measured with an impedance meter 20c having an AC power supply.

In this embodiment, the multilayer ceramic capacitor is put under a temperature higher than the Curie temperature of the ceramic dielectric layer and a voltage one third or more of the rated voltage of the multilayer ceramic capacitor used is for the measurement. The AC impedance is measured before and after the highly accelerated life under these conditions and the rate of a decrease in resistance of the crystal grain boundaries 9 in the ceramic dielectric layer 5 is measured.

Figure 6A:
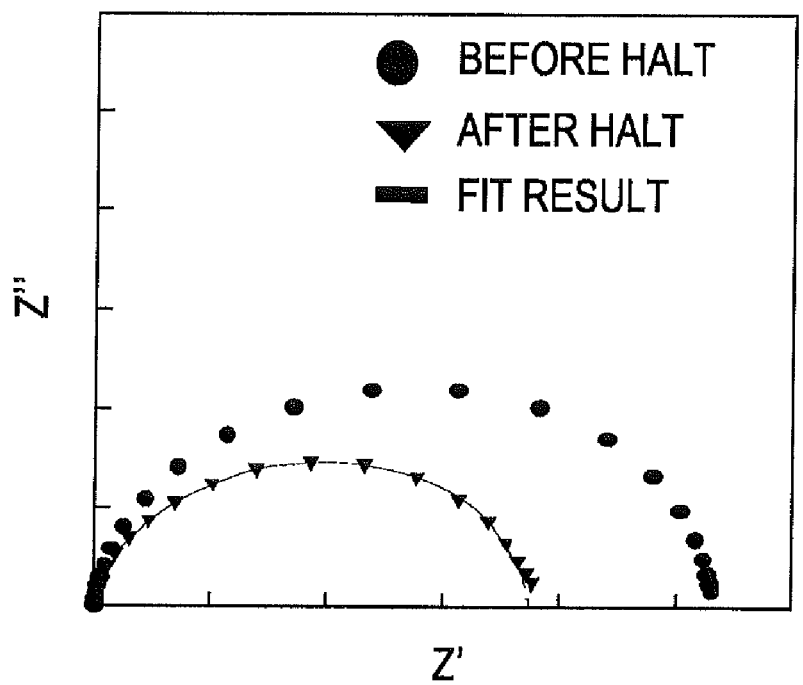
FIG. 6A is a graph (Cole-Cole plot) showing the change in impedance at the core (central portion) and the shell (peripheral portion) of the crystal grains, the grain boundaries, and the interface between the internal electrode layers and the ceramic dielectric layers of the multilayer ceramic capacitor
Figure 6B:
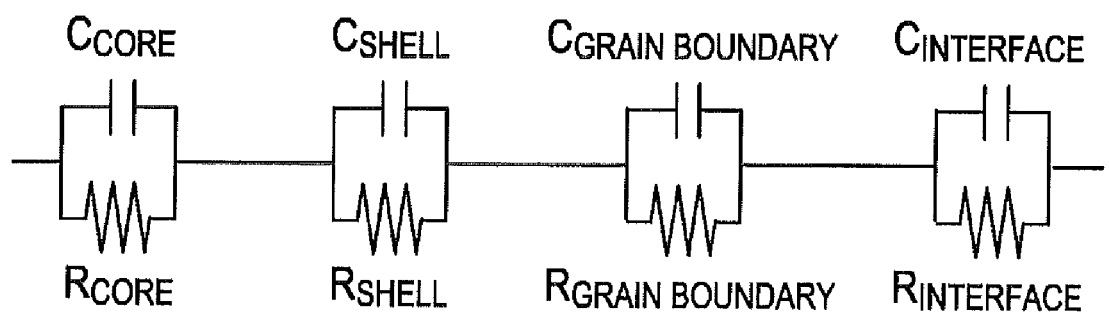
FIG. 6B is an equivalent circuit.
Figure 7A:
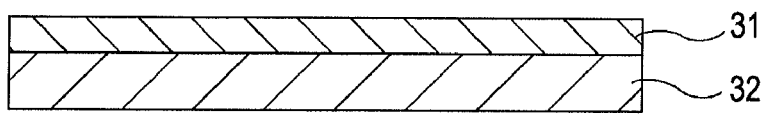
Figure 7B:
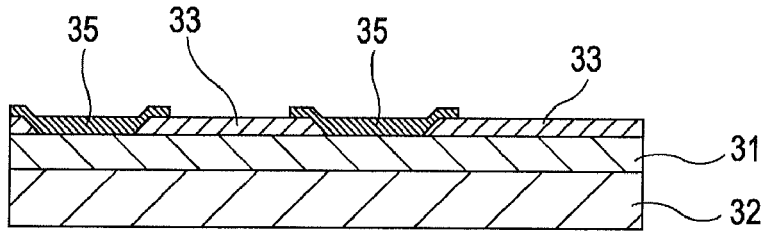
Figures 1, 7C:
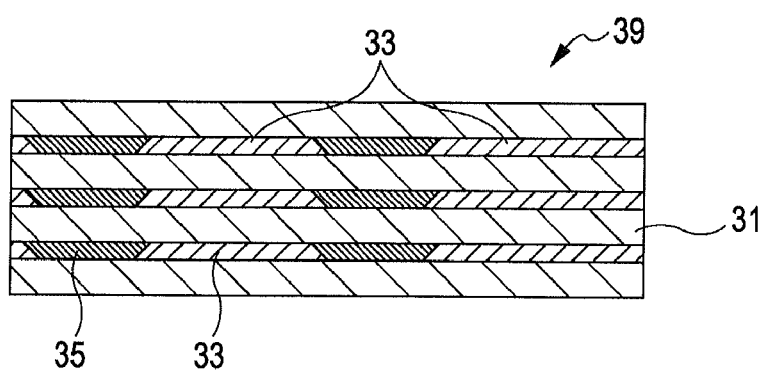
Figures 2, 7C:
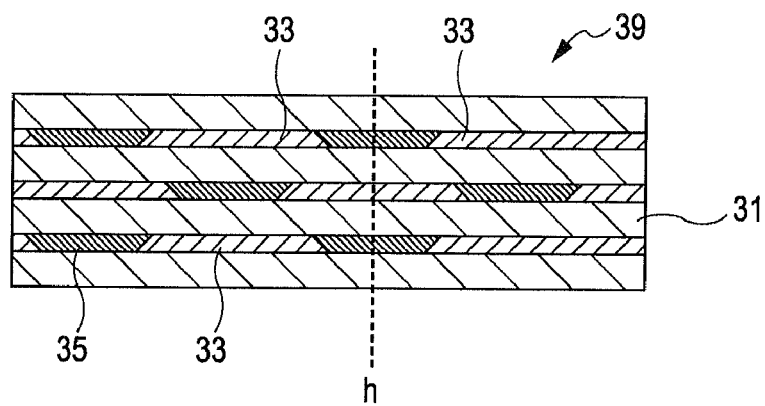
Figure 8:
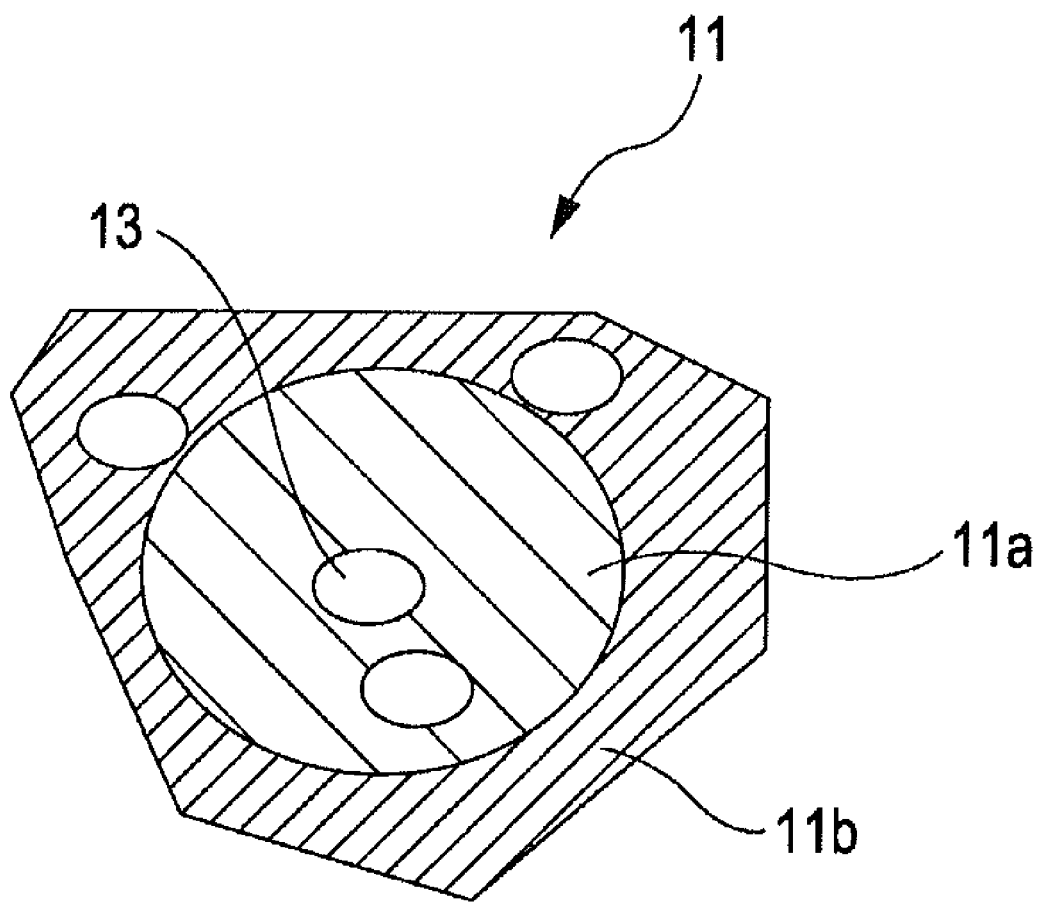
FIG. 8 is a schematic diagram showing the inner structure of a barium titanate crystal grain of the related art.

FIG. 6A is a graph (Cole-Cole plot) showing the change in impedance at the core 11a (central portion) and the shell 11b (peripheral portion) of the crystal grains 11, the grain boundaries, and the interface between the internal electrode layers and the ceramic dielectric layers of the multilayer ceramic capacitor. In this evaluation, as shown by an equivalent circuit in FIG. 6B, the ceramic dielectric layer 5 is divided into four components: the core 11a, the shell 11b, the grain boundary 9, and the interface between the internal electrode layer 7 and the ceramic dielectric layer 5. The horizontal axis of the graph indicates the real part of the impedance signal and the vertical axis of the graph indicates the imaginary part of the impedance signal. The graph showing the change in impedance shows the difference between before and after HALT under a high temperature load and the fitting through simulation. In this embodiment, the change in resistance of the crystal grain boundaries 9 is focused. In relation to the results of the HALT test (temperature: 85° C. to 125° C., application voltage: twice the rated voltage of the multilayer ceramic capacitor), the rate of change in the real part is preferably 1%/min or less, more preferably 0.76%/min or less. The minimum rate of change in the real part is 0.48%/min. This evaluation can be done by dividing the Cole-Cole plot in FIG. 6A before and after HALT into the four components described above by using impedance analysis software, for example that available from Scribner Associates. Here, the temperature is preferably 1.5 times the Curie temperature and the voltage is preferably 2.5 times the rated voltage since, under such highly accelerated life conditions, diffusion of ions and movement of electrons in the ceramic dielectric layer 5 are enhanced from before to after the treatment and the rate of decrease in resistance of the crystal grain boundaries 9 is significant.

A method for making the multilayer ceramic capacitor is now described in detail. FIGS. 7A to 7C-2 are diagrams showing the steps of making the multilayer ceramic capacitor.

Step (a)

First, a dielectric powder, which is a starting material described below, is mixed with an organic resin such as a polyvinyl butyral and solvents such as toluene and alcohol in, for example, a ball mill to prepare a ceramic slurry. Ceramic green sheets 31 are formed from the ceramic slurry by a sheet-forming method such as a doctor blade method or a die-coating method. The thickness of each of the ceramic green sheets 31 is preferably 1 to 3 μm to pursue thickness reduction for increasing the capacitance of the ceramic dielectric layer 5 and to maintain the high insulating property.

The dielectric powder contains a perovskite barium titanate powder having some of the A sites substituted with calcium (this powder is hereinafter referred to as "BCT powder") and a perovskite barium titanate powder free of Ca (this powder is hereinafter referred to as "BT powder"). The BCT powder is represented by $(Ba_{1-x}Ca_x)TiO_3$ and the BT powder is represented by $BaTiO_3$. The ratio of Ca substitution in the A sites in the BCT powder is preferably X=0.01 to 0.2, more preferably, X=0.03 to 0.1.

The atomic ratio A/B of the A sites (barium) to the B sites (titanium) of BCT powder is preferably 1.003 or more. At an atomic ratio A/B of 1.003 or more, the grain growth of the BCT crystals can be suppressed and the highly accelerated life can be improved due to the enhanced insulating property. The amount of the alkali metal oxides contained as impurities is preferably 0.02 percent by mass or less. The BT powder and the BCT powder are synthesized by mixing compounds respectively containing a Ba component, a Ca component, and a Ti component to yield a particular composition. These dielectric powders are obtained by a synthetic method selected from liquid phase processes such as a co-precipitation process and an oxalate process, and a hydrothermal synthetic process. It is more preferable to use dielectric powders prepared by a hydrothermal synthetic process because such powders have a narrow particle size distribution, are fine, and exhibit high crystallinity.

The particle size distributions of the BT powder and the BCT powder used as the dielectric powder are preferably in the range of 0.05 to 0.3 μm to facilitate the thickness reduction of the ceramic dielectric layers 5 and increase the relative dielectric constant of the dielectric powders.

Although fine BT powders and BCT powders can be obtained by the hydrothermal synthetic process, the oxalate process, or the co-precipitation process, the resulting BT powders and BCT powders usually include pores inside the particles. This is because the BT powder and the BCT powder obtained by the hydrothermal synthetic method or the like contain a large amount of water and OH radicals in the perovskite structures. In general, the water and OH radicals inside the powders are removed from the powders in the process of calcining or firing the powders. In the process of calcining or firing the BT powder and the BCT powder, the removal of water and the OH radicals occurs at the same time with grain growth. Thus, pores are easily formed.

In this embodiment, the resulting dielectric powder, i.e., a mixture of the BT powder and the BCT powder, is coated with additives such as MgO, an oxide of a rare earth element, MnO, and the like so that these additives are dissolved in the particle surfaces.

The total amount of the rare earth element in the dielectric powder containing the BCT powder and the BT powder is preferably 0.5 to 3 mol % on an oxide basis relative to 100 mol % of the dielectric powder. The rare earth element is preferably at least one element selected from Y, Dy, Yb, Tb, and other suitable rare earth elements. Among these, Y, Dy and Ho are preferred; the ionic radii for these elements is in the range from 0.105 to 0.106 nm, and thus they dissolve well in solid $BaTiO_3$ to form a shell layer. The Mg content on MgO basis is preferably 0.5 to 1 mol % relative to the 100 mol % of the dielectric powder, which is the mixture of the BCT powder and the BT powder. The Mn content on MnO basis is preferably 0.2 to 0.5 mole relative to the 100 mol % of the dielectric powder.

The additives can be more homogeneously dissolved into the BT and BCT powders by coating the particle surfaces of the BT and BCT powder with oxides of Mg, oxides of the rare earth element, and/or oxides of Mn. Moreover, the pores 13 can be eliminated from the shells 11*b* of the BT powder and the BCT powder while allowing them to remain in the cores 11*a*. As a result, the dielectric characteristics of the BT powder and the BCT powder can be stabilized.

A sintering aid added to the dielectric powder containing the BT powder and the BCT powder is preferably a sol-gel glass having a composition of $BaO:CaO:SiO_2=25$ to 35:45 to 55:15 to 25.

Step (b)

A rectangular internal electrode pattern 33 is formed on a main surface of each green sheet 31 prepared. A conductor paste from which the internal electrode pattern 33 is formed is prepared by mixing a Ni or Ni alloy as the main component metal with a ceramic powder as a common material, an organic binder, a solvent, and a dispersant.

The thickness of the internal electrode pattern 33 is preferably 1 μm or less to reduce the size of the multilayer ceramic capacitor and to decrease the step difference generated by formation of the internal electrode pattern 33.

It is also preferable to form a ceramic pattern 35 having substantially the same thickness as the internal electrode pattern 33 around the internal electrode pattern 33 to eliminate any step difference generated by the internal electrode pattern 33 on the ceramic green sheet 31. The ceramic component constituting the ceramic pattern 35 preferably contains the same dielectric powder used in the ceramic green sheet 31 from so that the same degree of firing shrinkage is obtained during simultaneous firing.

Step (c)

An adequate number of ceramic green sheets 31 with the internal electrode patterns 33 thereon are stacked, and a plurality of the ceramic green sheets 31 not provided with the internal electrode patterns 33 is stacked on the top and the bottom of the stack so that the same number of ceramic green sheets 31 without internal electrode patterns 33 are formed at the top and the bottom. As a result, a preliminary laminated body is formed. The internal electrode patterns 33 in the preliminary laminated body are displaced from one another, typically by a distance corresponding to half the pattern length in the longitudinal direction, but in any event having the electrode patterns overlapping. By this arrangement, the internal electrode patterns 33 appear in the end faces of the laminated body in an alternating fashion after cutting.

Instead of by employing the above-described process of stacking the ceramic green sheets 31 with the internal electrode patterns 33 on their main surfaces prepared in advance, the preliminary laminated body can be formed by attaching a ceramic green sheet 31 on a substrate at the lower side of the ceramic green sheet 31, printing the internal electrode pattern 33 on the ceramic green sheet 31, drying the ceramic green sheet 31 and the internal electrode pattern 33, stacking a next ceramic green sheet 31 without the internal electrode pattern 33 on the printed and dried internal electrode pattern 33 so as to allow the next ceramic green sheet 31 to temporarily attach to the internal electrode pattern 33, and repeating the attachment of the ceramic green sheet 31 and the printing of the internal electrode pattern 33 sequentially.

The preliminary laminated body is pressed at a temperature and a pressure higher than those during formation of the preliminary laminated body so as to form a laminated body 39 in which the ceramic green sheets 31 and the internal electrode patterns 33 are tightly attached. The laminated body 39 is then cut along a cutting line h. In other words, the laminated body 39 is cut approximately at the center of the ceramic pattern 35 in the laminated body in a direction perpendicular to the longitudinal direction of the ceramic pattern 35 (see FIGS. 7C-1 and 7C-2) so as to expose the end portions of the internal electrode patterns 33 and to thereby form a capacitor main body material. The internal electrode patterns 33 are not exposed at the side-edges.

The laminated body of the capacitor main body is fired in a predetermined atmosphere at a predetermined temperature condition to form a capacitor main body. In some cases, the capacitor main body may be barrel-polished to bevel the edges of the capacitor main body and to expose the internal electrode layers 7 from the opposing end faces of the capacitor main body 1. In this method, degreasing is preferably conducted in the temperature up to 500° C. at a heating rate of 5 to 20° C./h; the maximum of the firing temperature is preferably in the range of 1000° C. to 1250° C.; the heating rate from the degreasing to the maximum temperature is preferably 200 to 500° C./h; the retention time at the maximum temperature is preferably 0.5 to 4 hours; the cooling rate from the maximum temperature to 1000° C. is preferably 200 to 500° C./h; the atmosphere is preferably nitrogen-hydrogen; and the maximum temperature of the heat treatment (reoxidation treatment) after firing is preferably 900 to 1100° C. and the atmosphere is preferably nitrogen.

An external electrode paste is then applied on the opposing ends of the capacitor main body 1 and baked to form the external electrodes 3. A plating film is formed on each of the external electrodes 3 to enhance the mounting property.

The following Examples of the invention are only illustrative. The scope of the invention is defined only by the claims following.

EXAMPLES

A multilayer ceramic capacitor was prepared as follows. A mixture of a BT powder ($BaTiO_3$) and a BCT powder ($Ba_{1-x}Ca_xTiO_3$, x=0.05) was used as the dielectric powder. The site ratio A/B was 1.003. In Table 1, the dielectric powder used in the oxalate process and the hydrothermal synthetic process was a 1:1 (mol) mixture of the BT powder and the BCT powder. The dielectric powder used in the alkoxide process was the BT powder alone. The average particle diameters of the BT powder and the PCT powder used are shown in Table 1. A mixture of 30 mol % BaO, 20 mol % CaO, and 50 mol % $SiO_2$ and a mixture of 90 mol % $SiO_2$ and 10 mol % of $B_2O_3$ having a melting point of 950° C. were used as sintering aids. In 100 mol % of the barium titanate powder, the MgO content was 1 mol %, the MnO content was 0.3 mol %, and the rare earth element content was 1 mol % on an oxide basis. These additives were subjected to a wet process so as to coat the surfaces of the barium titanate particles and were affixed on the particle surfaces by heating at a temperature of 500° C. or less.

The dielectric powder was wet-mixed with a mixed solvent of toluene and alcohol in a ball mill using zirconia balls having a diameter of 5 mm. A polyvinyl butyral resin and a mixed solvent of toluene and alcohol were added to the wet mixed dielectric powder, and the resulting mixture was wet-mixed using zirconia balls having a diameter of 5 mm to prepare ceramic slurry. Ceramic green sheets having a thickness of 2.5 μm were formed from the resulting ceramic slurry by a doctor blade method.

A plurality of rectangular inner electrode patterns mainly composed of Ni was formed on an upper surface of the ceramic green sheet. The conductor paste used in forming the inner electrode patterns contained a Ni powder having an average particle diameter of 0.3 μm. The BT powder used in forming the ceramic green sheet was used as a common material and 30 parts by mass of the BT powder was added to the Ni powder per 100 parts by mass of the Ni powder.

One hundred ceramic green sheets with the inner electrode patterns printed thereon were stacked, and twenty ceramic green sheets with no inner electrode patterns were stacked on the top and the bottom of the stack of the one hundred ceramic green sheets. The resulting stack was processed with a press machine at a temperature of 60° C. and a pressure of $10^7$ Pa for 10 minutes and then cut into a predetermined size to form capacitor main body laminates.

The resulting capacitor main body laminates were heated at a heating rate of 10° C./h and subjected to a binder extraction process in air at a temperature of 300° C., and then were heated at the same rate until 500° C. was reached. Then the heating rate was changed to 300° C./h until the firing temperature was reached. The laminated bodies were fired for two hours at 1040° C. to 1200° C. in hydrogen-nitrogen. The capacitor main body laminates were then cooled to 1000° C. at a cooling rate of 300° C./h and subjected to a reoxidation process for 4 hours at 1000° C. in a nitrogen atmosphere followed by cooling at a cooling rate of 300° C./h to prepare capacitor main bodies. Each of the capacitor main bodies was 1×0.5×0.5 $mm^3$ in size and the thickness of the ceramic dielectric layer was 1.8 μm.

The resulting capacitor main body was barrel-polished. An external electrode paste containing a Cu powder and a glass was applied on two ends of the capacitor main body and baked at 850° C. to form external electrodes. A Ni plating layer and then a Sn plating layer were formed on the surface of each external electrode by using an electrolytic barrel to form a multilayer ceramic capacitor.

The multilayer ceramic capacitor was evaluated as follows. The capacitance of the multilayer ceramic capacitor was measured at 25° C., a frequency of 1.0 kHz, and a measurement voltage of 0.5 Vrms. The temperature characteristic of the capacitance was measured at 85° C., and the rate of change with respect to the value observed at 25° C. was evaluated. The average grain diameter of the barium titanate crystal grains constituting the ceramic dielectric layer was determined with a scanning electron microscope (SEM). The surface of the multilayer ceramic capacitor as a specimen was polished until it turned to a mirror surface and the polished surface was etched. The surface of the specimen was placed inside a SEM to take a picture and twenty crystal grains in the micrograph were selected at random. The maximum diameter of each crystal grain was determined by an intercept method, and the average was calculated from the results.

The core-shell structure of the barium titanate crystal grains was analyzed with a transmission electron microscope. Among a plurality of crystal grains observed with the transmission electron microscope, those having a region at the center of the barium titanate crystal grain where parallel streaks of crystals indicating that domain regions appear, were identified as those having a core-shell structure. The presence of pores in the core or shell was directly determined from the transmission electron micrograph. A sample in which 90% or more of the barium titanate crystal grains observed had pores existing in the cores only was considered as a sample having pores located in the core. The number of the crystal grains observed was fifty per sample. In Samples shown in Table 1, the samples containing barium titanate crystal grains having an average grain diameter of 181 nm or less (Samples 1, 2, 4, 5, 7, 21, and 22) had pores existing only in the cores.

TEM-EDS confirmed that the cores have substantially no rare earth element therein and that the Y concentration in the shell was gradually increased toward the surface of the grain. Ten specimens were used for the measurement.

The state of solid solution of the rare earth element was assessed by the following technique from the results of XPS analysis on the basis of the average grain diameter already determined. At an XPS peak intensity ratio REp/Os in the range of 0.3 to 0.7, it was determined that the rare earth element was dissolved in the grains. Particularly, it was determined that the rare earth element was dissolved into the surface of the grain so as to form a layer or a shell at an average grain size in the range of 0.1 to 0.3, and at an XPS peak intensity ratio REp/Os in the range of 0.4 to 0.6.

An XPS valence band spectrum was measured at 0 to 50 eV. Since the outermost surface of a sample was affected by deposits, several tens of nanometers of the surface was removed by sputtering and the new surface so revealed was analyzed. Subsequently, in a valence band spectrum with a decreased base line, the ratio of the peak intensity of the p-orbital (near 24 eV) of the rare earth element to the peak intensity (21 eV) of O2S, i.e., the peak intensity ratio REp/Os, was determined. It is assumed that the smaller the peak intensity ratio REp/Os, the more progressed the dissolution of the additive elements.

In general, as the dissolution of the rare earth elements into the barium titanate progresses, the grain diameter increases. Thus, the grain diameter of the crystal grains was determined under SEM observation and the relationship between the grain diameter and the XPS peak intensity ratio REp/Os was studied to derive the relationship I=a+bD (a>0, b<0) where I represents the peak intensity ratio REp/Os, D represents the average grain diameter of the crystal grain, a represents the y intercept (D=0) of the linear equation of the graph represented by I=a+bD, and b represents a slope of the line. According to this method, the measurement which has required a long time for energy dispersive X-ray spectrometry (EDS) using a transmission electron microscope (TEM) can be done in a short time and it is easy to identify the solid solution state of the additive element.

Thus comparing to TEM-EDS analysis and XPS analysis, of barium titanate crystal grains with rare earth element dissolved totally or partially therein as shells with ratio REp/Os and having average grain size, the status of solid solution of a rare earth element is identified. Note that five specimens were used for each sample.

As the evaluation of the grain boundaries under highly accelerated life test, an AC impedance method was employed to separately conduct the measurement. As for the highly accelerated life conditions, the temperature was 250° C., and the voltage applied to the external electrodes of the multilayer ceramic capacitor was 2 V/μm. The voltage during measurement was 0.1 V, the frequency was 10 mHz to 10 kHz, and the sample was left to stand for 1 hour. The AC impedance before and after this treatment was observed for thirty specimens and the rate of change in resistance was determined. The DC bias characteristic was measured by applying DC voltage of 0 V and 3.15 V at 25° C. under the above-described conditions for measuring the capacitance. The rate of change in capacitance at 3.15 V with respect to the capacitance at 0 V was determined.

A comparative example was prepared by adding powders of oxides of Mg, a rare earth element, and Mn in amounts the same as in the case these elements were added as the coatings to the barium titanate powder, and evaluation and analysis were conducted in the same manner. The results are shown in Tables 1 and 2. In samples 10 to 19 of the table 2, a barium titanate crystal grain does not have a core-shell structure and pores are all over the grain despite the indication of a core and shell in Table 2.

TABLE 1

| | Barium titanate | | Additives | |
|---|---|---|---|---|
| Sample No. | Synthetic method | Average particle diameter nm | Provided as coating | Not provided as coating (normal addition) |
| 1 | Oxalate | 103 | X | |
| 2 | Oxalate | 151 | X | |
| 3 | Oxalate | 208 | X | |
| 4 | Hydrothermal | 105 | X | |
| 5 | Hydrothermal | 148 | X | |
| 6 | Hydrothermal | 201 | X | |
| 7 | Alkoxide | 104 | X | |
| 8 | Alkoxide | 150 | X | |
| 9 | Alkoxide | 203 | X | |
| 10 | Oxalate | 103 | | X |
| 11 | Oxalate | 151 | | X |
| 12 | Oxalate | 208 | | X |
| 13 | Hydrothermal | 105 | | X |
| 14 | Hydrothermal | 148 | | X |
| 15 | Hydrothermal | 201 | | X |
| 16 | Alkoxide | 104 | | X |
| 17 | Alkoxide | 150 | | X |
| 18 | Alkoxide | 203 | | X |
| 19 | Hydrothermal | 105 | X | |
| 20 | Hydrothermal | 105 | X | |
| 21 | Hydrothermal | 105 | X | |
| 22 | Hydrothermal | 105 | X | |

TABLE 2

| | | Barium titanate crystal particles | | | | | | | | | | | |
|---|---|---|---|---|---|---|---|---|---|---|---|---|---|
| Sample No. | Rare earth element | Core-shell structure with layered rare earth element (#) | Average diameter nm | Location of pores Core | Location of pores Shell | percentage of barium titanate crystal garins having pores in the cores only over the total number of the grains observed % | No. of pores in crystal grains | Average diameter of pores nm | Diameter of pores/ diameter of barium titanate crystal grains** — | Peak intensity ratio (REp/Os) — | Capacitance μF | Temperature characteristic of capacitance (85° C.) % | Rate of decrease in resistance of grain boundaries %/min | DC bias 25° C. 3.15 V % |
| 1 | Y | ○ | 124 | ○ | x | 100 | 1 | 22 | 0.18 | 0.59 | 0.84 | 9.4 | 0.56 | −16.8 |
| 2 | Y | ○ | 181 | ○ | x | 100 | 1 | 25 | 0.14 | 0.49 | 0.92 | 12.2 | 0.76 | −15.2 |
| 3 | Y | ○ | 190 | ○ | x | 90 | 2 | 21 | 0.22 | 0.39 | 1.01 | 13.6 | 0.95 | −18.0 |
| 4 | Y | ○ | 126 | ○ | x | 100 | 1 | 14 | 0.11 | 0.56 | 0.85 | 9.1 | 0.61 | −14.5 |
| 5 | Y | ○ | 178 | ○ | x | 100 | 1 | 30 | 0.17 | 0.52 | 0.94 | 12.3 | 0.80 | −16.5 |
| 6 | Y | ○ | 200 | ○ | x | 90 | 2 | 26 | 0.26 | 0.38 | 1.03 | 14.1 | 0.96 | −19.0 |
| 7 | Y | ○ | 125 | ○ | x | 100 | 1 | 20 | 0.16 | 0.57 | 0.84 | 14.9 | 0.48 | −15.8 |
| 8 | Y | ○ | 180 | ○ | x | 90 | 2 | 20 | 0.22 | 0.50 | 0.91 | 13.8 | 0.97 | −20.0 |
| 9 | Y | ○ | 244 | ○ | x | 90 | 2 | 30 | 0.25 | 0.37 | 1.05 | 14.0 | 0.98 | −21.0 |
| 10 | Y | x | 134 | ○ | ○ | 65 | 2 | 38 | 0.57 | 0.55 | 0.73 | 8.3 | 1.43 | −22.1 |

TABLE 2-continued

| | | | | Barium titanate crystal particles | | | | | | | | | |
|---|---|---|---|---|---|---|---|---|---|---|---|---|---|
| Sample No. | Rare earth element | Core-shell structure with layered rare earth element (#) | Average diameter nm | Location of pores | | percentage of barium titanate crystal grains having pores in the cores only over the total number of the grains observed % | No. of pores in crystal grains | Average diameter of pores nm | Diameter of pores/ diameter of barium titanate crystal grains** | Peak intensity ratio (REp/Os) | Capacitance μF | Temperature characteristic of capacitance (85° C.) % | Rate of decrease in resistance of grain boundaries %/min | DC bias 25° C. 3.15 V % |
| | | | | Core | Shell | | | | | | | | | |
| 11 | Y | x | 196 | ○ | ○ | 70 | 2 | 36 | 0.37 | 0.46 | 0.82 | 10.3 | 1.69 | −22.0 |
| 12 | Y | x | 270 | ○ | ○ | 70 | 3 | 34 | 0.38 | 0.31 | 0.89 | 11.7 | 1.77 | −23.0 |
| 13 | Y | x | 137 | ○ | ○ | 65 | 3 | 30 | 0.66 | 0.53 | 0.72 | 8.1 | 1.70 | −23.2 |
| 14 | Y | x | 192 | ○ | ○ | 70 | 3 | 44 | 0.69 | 0.46 | 0.81 | 10.7 | 1.65 | −23.0 |
| 15 | Y | x | 261 | ○ | ○ | 65 | 4 | 56 | 0.86 | 0.33 | 0.90 | 12.2 | 2.14 | −25.4 |
| 18 | Y | x | 135 | ○ | ○ | 65 | 2 | 23 | 0.34 | 0.54 | 0.74 | 7.9 | 1.67 | −21.8 |
| 17 | Y | x | 195 | ○ | ○ | 70 | 3 | 40 | 0.62 | 0.46 | 0.84 | 10.3 | 2.19 | −23.4 |
| 18 | Y | x | 264 | ○ | ○ | 70 | 4 | 60 | 0.91 | 0.33 | 0.95 | 12.4 | 1.89 | −28.4 |
| 19 | Sm | x | 202 | ○ | ○ | 70 | 1 | 27 | 0.13 | 0.31 | 1.08 | 15.4 | 2.54 | −40.7 |
| 20 | Yb | ○ | 197 | ○ | ○ | 70 | 1 | 25 | 0.13 | 0.69 | 0.81 | 7.2 | 1.99 | −14.0 |
| 21 | Dy | ○ | 127 | ○ | x | 100 | 1 | 15 | 0.12 | 0.55 | 0.85 | 9.2 | 0.62 | −14.6 |
| 22 | Ho | ○ | 128 | ○ | x | 100 | 1 | 16 | 0.13 | 0.54 | 0.85 | 9.2 | 0.63 | −14.7 |

**In samples with two or more pores, the diameter of the pores equals to the product of the number of pores and the average diameter of one pore.
Circular marks indicate that the rare earth element is formed as a layer and a core-shell structure is formed.
Cross marks indicate that the rare earth element is not formed as a layer and a core-shell structure is not formed.

The results in Tables 1 and 2 clearly show that Samples 1 to 9 and 21 to 22 in which the surfaces of the barium titanate grains are coated with Y, Dy or Ho, the rare earth element being dissolved in and forming shells on the surfaces of the barium titanate crystal grains after firing, and having pores mainly formed in the cores of the grains. These samples also exhibit high capacitance, good highly accelerated life time, a smaller decrease in capacitance under application of DC current, and a good DC bias characteristic.

The samples 1 to 5, 7, 8 and 21 to 22, which have average grain diameter from 124 to 190 nm, show a rate of decrease in resistance of the grain boundaries of 0.97%/min or less, and a DC bias characteristic, which is the rate of decrease in capacitance when DC bias is applied, is within 20%.

In the samples 1, 2, 4, 5, 7, 21 and 22 having one pore in each crystal grain and having a Dp/D ratio of 0.2 or less, the decrease in resistance of the grain boundaries in the highly accelerated life test was maintained to be within −16.8%.

Among samples having Dp/D of 0.2 or less of Dp/D and containing one or less pore in each crystal grain, Samples 2, 4, 5, 7, 21, and 22 having a peak intensity ratio REp/Os (Os: XPS peak intensity of s-orbital of oxygen contained in the barium titanate crystal grains, REp: XPS peak intensity of p-orbital of the rare earth element) in the range of 0.49 to 0.57 showed a rate of decrease in resistance value of the grain boundaries in the highly accelerated life test of 0.8%/min or less and a DC bias characteristic of −16.5% or less.

In contrast, Samples 10 to 18 containing oxides of Mg, Y, and Mn and Samples 19 containing samarium (Sm) as the rare earth element had no clearly identifiable shells into which Y and Sm were dissolved and contained many pores, some of which were distributed near the grain boundaries rather than in the center of the crystal grains. Furthermore, in the Sample 20, since the dielectric crystal grain has core-shell structure, the highly accelerated life was greater than 1%/min and the DC bias characteristic was greater than −21.8%.

What is claimed is:

1. A multilayer ceramic capacitor comprising:
A plurality of ceramic dielectric layers comprising barium titanate crystal grains each comprising a core-shell structure comprising a core and a shell around the core, wherein the barium titanate crystal grains each comprise one or more pores inside, and the one or more pores are mainly in the core of the core-shell structure.

2. The multilayer ceramic capacitor according to claim 1, wherein an average diameter of the pores is 0.2 or less of an average diameter of the barium titanate crystal grains.

3. The multilayer ceramic capacitor according to claim 1, wherein: the barium titanate crystal grains contain a rare earth element; and a peak intensity ratio REp/Os is in the range of 0.4 to 0.6, where Os is an XPS peak intensity of the s-orbital of oxygen contained in the barium titanate crystal grains and REp is an XPS peak intensity of the p-orbital of the rare earth element.

4. The multilayer ceramic capacitor according to claim 1, wherein the barium titanate crystal grains include barium titanate crystal grains containing 0.2 atomic % or less of Ca and barium titanate crystal grains containing 0.4 atomic % or more of Ca.

5. The multilayer ceramic capacitor according to claim 1, wherein a rate of decrease in resistance of grain boundaries in the ceramic dielectric layers determined by AC impedance measurement after application of high-temperature load in which a voltage one third or more of a rated voltage and a temperature higher than a Curie temperature of the ceramic dielectric layer are applied is 1%/min or less of a resistance of the grain boundaries in the ceramic dielectric layers determined by the AC impedance measurement before application of the high-temperature load.

6. The multilayer ceramic capacitor according to claims 1, wherein all of the one or more pores are in the core.

7. The multilayer ceramic capacitor according to claim 1, wherein the average grain diameter of the barium titanate crystal grains is between 0.124 μm and 0.19 μm.

8. The multilayer ceramic capacitor according to claim 1, further comprising a plurality of inner electrode layers between the ceramic dielectric layers.

9. The multilayer ceramic capacitor according to claim 8, further comprising a plurality of external electrodes electrically connected to the inner electrode layers.

* * * * *